United States Patent
Meert

(10) Patent No.: US 8,033,603 B2
(45) Date of Patent: Oct. 11, 2011

(54) VEHICLE SEAT NECK PROTECTION DEVICE

(76) Inventor: Clifford Bruce Meert, Naples, FL (US)

(*) Notice: Subject to any disclaimer, the term of this patent is extended or adjusted under 35 U.S.C. 154(b) by 0 days.

(21) Appl. No.: 11/848,323

(22) Filed: Aug. 31, 2007

(65) Prior Publication Data

US 2009/0058161 A1 Mar. 5, 2009

(51) Int. Cl.
*A61G 15/00* (2006.01)

(52) U.S. Cl. ........ 297/220; 297/397; 297/399; 297/400; 297/401; 297/402; 297/216.12

(58) Field of Classification Search ............... 297/220, 297/397, 399, 400, 401, 402, 216.12, 391, 297/284.5
See application file for complete search history.

(56) References Cited

U.S. PATENT DOCUMENTS

| | | | |
|---|---|---|---|
| 91,389 A * | 6/1869 | Weeden | 297/401 |
| 2,060,298 A * | 11/1936 | Gailey | 297/230.13 |
| 3,071,412 A | 1/1963 | Meade | |
| 3,279,849 A * | 10/1966 | Radke et al. | 297/284.5 |
| 4,114,948 A | 9/1978 | Perkey | |
| 4,471,993 A * | 9/1984 | Watson | 297/284.5 |
| 4,971,393 A * | 11/1990 | Maisenhalder | 297/397 |
| 5,015,036 A | 5/1991 | Fergie | |
| 5,108,150 A * | 4/1992 | Stas et al. | 297/397 |
| 5,135,283 A | 8/1992 | Cassese et al. | |
| 5,964,504 A | 10/1999 | Hogan et al. | |
| 6,431,651 B1 | 8/2002 | Lee | |
| 6,435,617 B1 * | 8/2002 | McNair | 297/397 |
| 6,513,686 B1 * | 2/2003 | Ben-Sasson | 224/275 |
| 6,669,300 B1 * | 12/2003 | Lee | 297/397 |
| 6,748,615 B1 | 6/2004 | Tiedemann | |
| 2002/0084685 A1 | 7/2002 | Lee | |
| 2006/0250015 A1* | 11/2006 | Buck | 297/397 |
| 2006/0273650 A1* | 12/2006 | Embach | 297/452.27 |

* cited by examiner

*Primary Examiner* — Laurie Cranmer
(74) *Attorney, Agent, or Firm* — The Livingston Firm; Edward M. Livingston, Esq.; Bryan L. Loeffler, Esq.

(57) ABSTRACT

A vehicle seat neck protection device (8) that protects and supports the nape of the neck (4) of a user wherein the device (8) has a body (27) of a predetermined size and shape and a convex surface (6) for positioning the device (8) behind the nape of a neck (4), a rear wall (10) located on the body (27) and at least one securing means (7) located on the rear wall (10) for securing the vehicle neck protection device (8) to at least one post (3) of a vehicle headrest (1). The body (27) may include a cushion area (12) that forms the convex surface (6) and a dense area (11) located between the cushion area (12) and the rear wall (10). In the alternative, an inflatable bladder (17) may form the convex surface (6) wherein a user may selectively adjust the degree of inflation of the bladder (17). The bladder (17) may also be automatically inflated upon strong impact against the vehicle itself. The device (8) may be retroactively fit onto an existing vehicle headrest (1) or may built-into a vehicle headrest (1).

17 Claims, 3 Drawing Sheets

VEHICLE SEAT NECK PROTECTION DEVICE

BACKGROUND OF THE INVENTION

This invention relates to vehicle seat neck protection devices, more particularly, a vehicle seat neck protection device that protects and supports the cervical spine, including the muscles, discs, fascia and joints of the nape of the neck of a user.

Currently, most vehicle headrests are attached to a vehicle seat wherein the headrest is extendable so as to provide a customized fit for a user. The user is able to place his/her head against the headrest while sitting in the seat, thereby permitting a user to sit more comfortably while in driving or riding in a vehicle. Although the headrest supports a user's head, a gap still exists between the nape of the neck of the user and the headrest as the nape of the neck is not supported by the headrest. Even if the headrest is positioned adjacent to the top of the seat, the gap still exists because of the design of the headrest.

Although not providing support to the nape of the neck is not inherently dangerous when driving or riding in a vehicle, if a person is in accident, he or she may experience greater damage to the muscles, discs, fascia and joints of the nape of the neck and to the first seven vertebrae of the spine known as the cervical spine than if the nape of the neck, or the cervical spine, were supported. Providing support to this area of the neck is of great importance because the cervical spine is especially susceptible to whiplash-type injuries caused by strong, sudden movements due to limited muscle support in the cervical area and the fact that this area of the spine must support a person's head which, on average, weighs fifteen pounds.

Thus, a need exists for a vehicle seat neck protection device that protects and supports the cervical spine, including the muscles, discs, fascia and joints of the nape of the neck of a user.

The relevant prior art includes the following references:

| Patent No. (U.S. unless stated otherwise) | Inventor | Issue/Publication Date |
| --- | --- | --- |
| 5,964,504 | Hogan et al. | Oct. 12, 1999 |
| 5,015,036 | Fergie | May 14, 1991 |
| 4,114,948 | Perkey | Sep. 19, 1978 |
| 6,748,615 | Tiedemann | Jun. 15, 2004 |
| 2002/0084685 | Lee | Jul. 4, 2002 |
| 6,431,651 | Lee | Aug. 13, 2002 |
| 3,071,412 | Meade | Jan. 1, 1963 |
| 5,135,283 | Cassese et al. | Aug. 4, 1992 |

SUMMARY OF THE INVENTION

The primary object of the present invention is to provide a vehicle seat neck protection device that protects and supports the nape of the neck of a user.

A further object of the present invention is to provide a vehicle seat neck protection device that is adjustable.

A further object of the present invention is to provide a vehicle seat neck protection device that is easy to use.

An even further object of the present invention is to provide a vehicle seat neck protection device that may be retroactively fit to an existing headrest.

Another object of the present invention is to provide a vehicle seat neck protection device that may be built into a headrest.

The present invention fulfills the above and other objects by providing a vehicle seat neck protection device that protects and supports the nape of the neck of a user wherein the device has a body of a predetermined size and shape having a convex surface for positioning the device behind the nape of a neck of the user, a rear wall located on the body and at least one securing means located on the rear wall for securing the vehicle neck protection device to at least one post of a vehicle headrest. The body may include a cushion area that forms the convex surface and a dense area located between the cushion area and the rear wall.

Alternatively, a bladder that inflates and deflates may form the convex surface of the body wherein a user may selectively adjust the degree of inflation of the bladder. The bladder may also be automatically inflated upon strong impact against the vehicle itself, such as during car crashes and accidents.

The vehicle seat neck protection device may be retroactively fit onto an existing vehicle headrest or may built-into a vehicle headrest.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
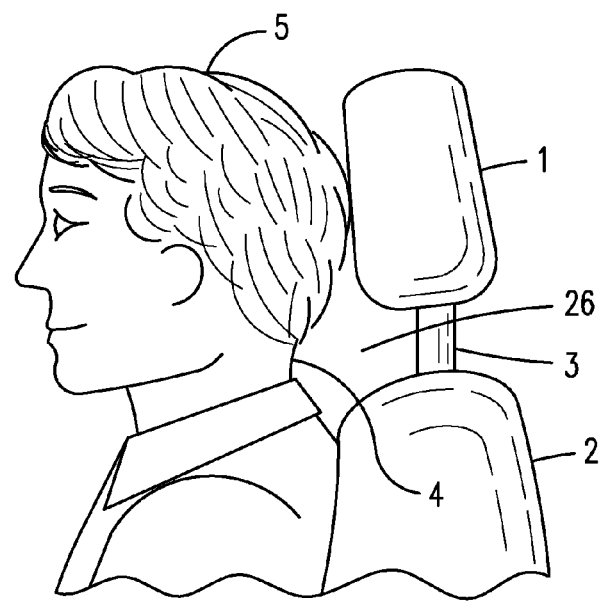
FIG. 1 is a side view of a user sitting in a conventional seat and headrest.

For purposes of describing the preferred embodiment, the terminology used in reference to the numbered components in the drawings is as follows:

| | |
| --- | --- |
| 1. | headrest |
| 2. | seat |
| 3. | post |
| 4. | nape of neck |
| 5. | head |
| 6. | convex surface |

-continued

| 7. | securing means |
| 8. | vehicle seat neck protection device, generally |
| 9. | aperture |
| 10. | rear wall |
| 11. | dense area |
| 12. | cushion area |
| 13. | first bracket |
| 14. | second bracket |
| 15. | post retaining area |
| 16. | U-shaped member |
| 17. | bladder |
| 18. | post securing strap |
| 19. | hook fastening means |
| 20. | loop fastening means |
| 21. | screw |
| 22. | pump |
| 23. | tube |
| 24. | snap |
| 25. | vertical strap |
| 26. | gap |
| 27. | body |
| 28. | clamp |
| 29. | release button |
| 30. | fastening means |

With reference to FIG. 1, a side view of a user sitting in a conventional seat and headrest is shown. A headrest 1 is secured to a seat 2 via at least one post 3 wherein the headrest 1 may be adjusted in a higher or lower position depending upon the height of a user and the ultimate location of a user's head 5 in relation to the headrest 1. When the ideal height of the headrest 1 is determined, that is, when the user determines the most comfortable height of the headrest 1 so as to rest his or her head 5 thereon, the nape of the neck 4 of the user is located a predetermined distance from the headrest 1 and the seat 2. In other words, the nape of the neck 4 does not rest against the headrest 1 nor against the seat 2, thereby leaving a gap 26 between the nape of the neck 4 and the headrest 1, seat 2 and post 3. Even if the headrest 1 is at its lowermost position wherein the headrest 1 is flush against the seat 2, the gap 26 still exists as neither the headrest 1 nor the seat 2 is convexly contoured so as to fit against the nape of the neck 4. Because the nape of the neck 4 is unsupported, the user is more susceptible to whiplash injuries during car crashes and accidents due to head and neck hyperextension.

Figure 2:
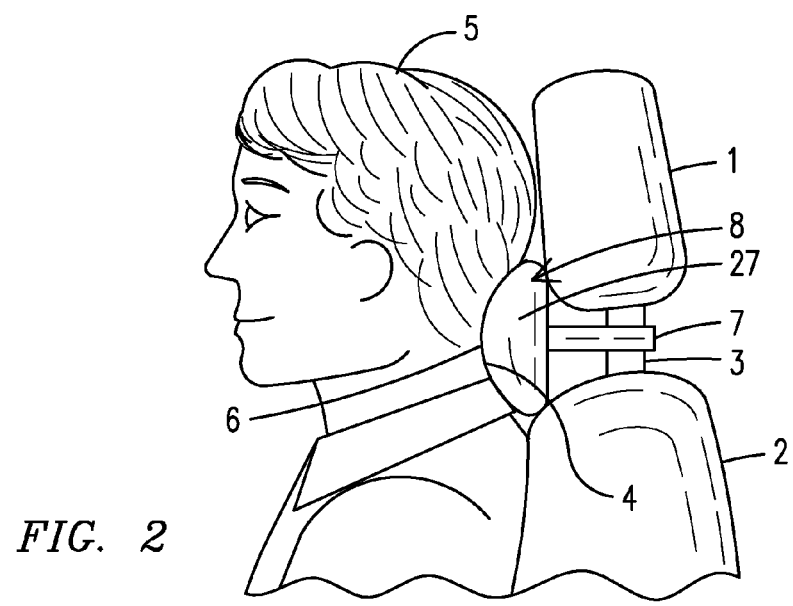
FIG. 2 is a side view a vehicle seat neck protection device of the present invention in use.

In FIG. 2, a side view of the vehicle seat neck protection device of the present invention in use is shown. The vehicle seat neck protection device 8 includes a body 27 of a predetermined size and shape having a convex surface 6 and at least one securing means 7 to secure the vehicle seat neck protection device 8 to at least one post 3. Because the body 27 has a convex surface 6, the nape of the neck 4 of a user is protected and supported at all times, thereby reducing the likelihood of injuries caused by whiplash.

Figure 3:
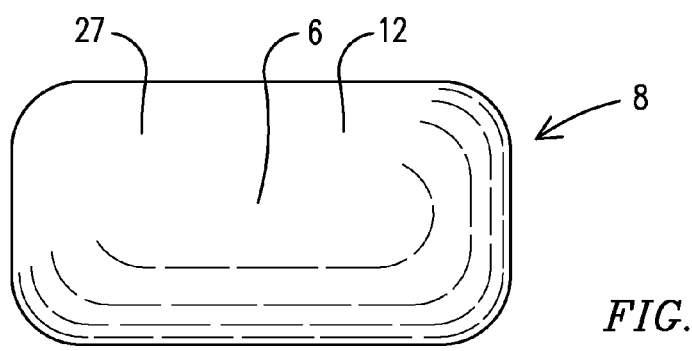
FIG. 3 is a front view of the vehicle seat neck protection device of the present invention.

Next, FIG. 3 shows a front view of the vehicle seat neck protection device of the present invention. The vehicle seat neck protection device 8 has a body 27 with a convex surface 6 wherein the convex surface 6 is preferably formed of a cushion area 12. In this manner, a user may comfortably rest his or her nape of the neck 4 on the convex surface 6. The cushion area 12 is preferably constructed of moderately dense foam, although any other material may be used. The cushion area 12 is also preferably covered by a vinyl upholstery so as to withstand much usage; however, the cushion area 12 may also be covered with other material, such as cloth, fabric, leather or any other material and may be of varying colors so as to match the color of the headrest 1 and seat 2.

Figure 4:
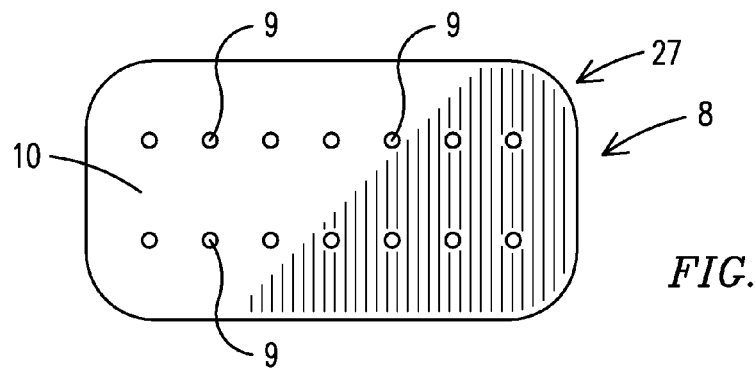
FIG. 4 is a rear view of the vehicle seat neck protection device of the present invention without securing means.

FIG. 4 shows a rear view of the vehicle seat neck protection device of the present invention without securing means. The body 27 of the vehicle seat neck protection device 8 preferably includes a rear wall 10 made of a predetermined material, which is preferably a rigid material, such as a hard plastic material. At least one aperture 9 is preferably located on the rear wall 10 for permitting a user to customize the width of the securing means 7 (as shown in FIG. 5) as the posts 3 of vehicle headrests 1 and seats 2 are spaced differently according to make and model of the vehicle.

Figure 5:
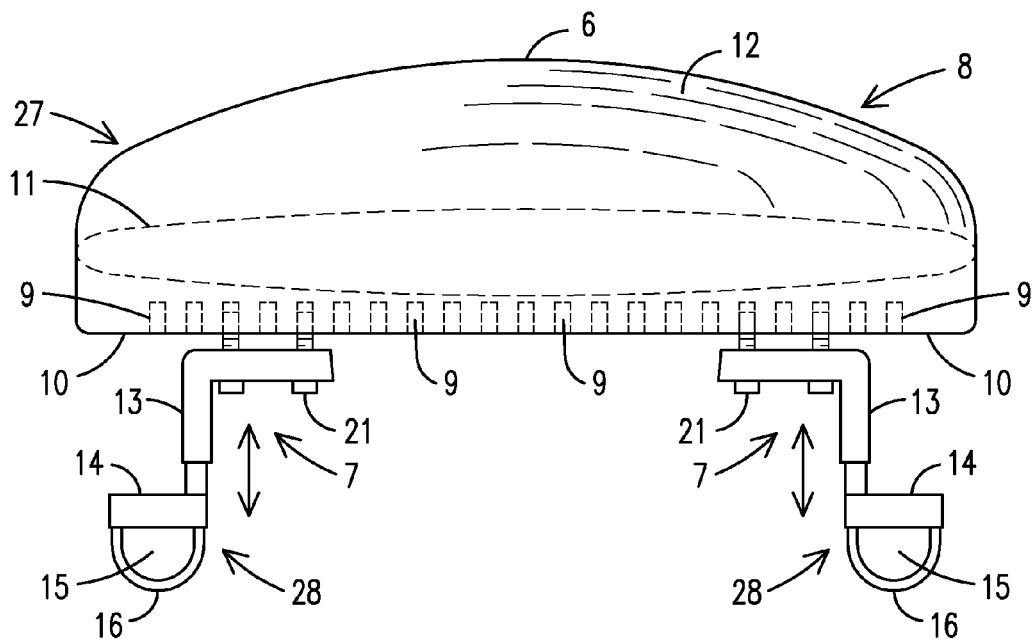
FIG. 5 is a top plan view of the vehicle seat neck protection device of the present invention.

Next, FIG. 5 shows a top plan view of the vehicle seat neck protection device of the present invention. The body 27 of the vehicle seat neck protection device 8 also preferably includes a dense area 11 located between the cushion area 12 and the rear wall 10 so as to provide additional protection and support to the vehicle seat neck protection device 8. The dense area 11 is preferably constructed of a very dense foam but may be constructed of any other material.

At least one securing means 7 is removably and adjustably secured to the rear wall 10. Preferably, the securing means 7 is at least one clamp 28 that is removably securable to at least one post 3 (not shown) wherein the post is ultimately secured within a post retaining area 15. The securing means 7 may include at least one first bracket 13 having at least one screw 21 for securing the securing means 7 to the rear wall 10 by inserting the screws 21 into the apertures 9 on the rear wall 10. Because there are a plurality of apertures 9 on the rear wall 10, a user will be able to accommodate posts 3 having various distances between each post 3, i.e., typically smaller cars have smaller distances between the posts 3 as compared to larger trucks. In addition, the first bracket 13 may be rotated so as to accommodate posts 3 having an extremely large space between each post 3.

A second bracket 14, which is preferably telescopingly extendable within the first bracket 13 so as to permit a user to move the device 8 closer to the nape of the neck 4 or further from the nape of the neck 4, has a U-shaped member 16 that forms the post retaining area 15.

Figure 6:
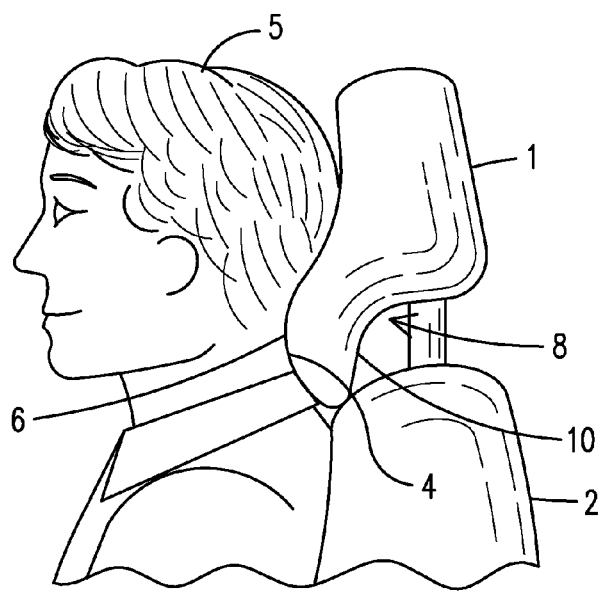
FIG. 6 is a side view of a vehicle seat neck protection device of the present invention built into a headrest.

With respect to FIG. 6, a side view of a vehicle seat neck protection device of the present invention built into a headrest is shown. The vehicle seat neck protection device 8 extends from a headrest 1 and includes a convex surface 6 for protecting and supporting the nape of the neck 4 of the user and a rear wall 10. Because the vehicle seat neck protection device 8 is built into the headrest 1, the user simply adjusts the height of the headrest 1 so as to position the convex surface 6 behind the nape of the neck 4.

Figure 7:
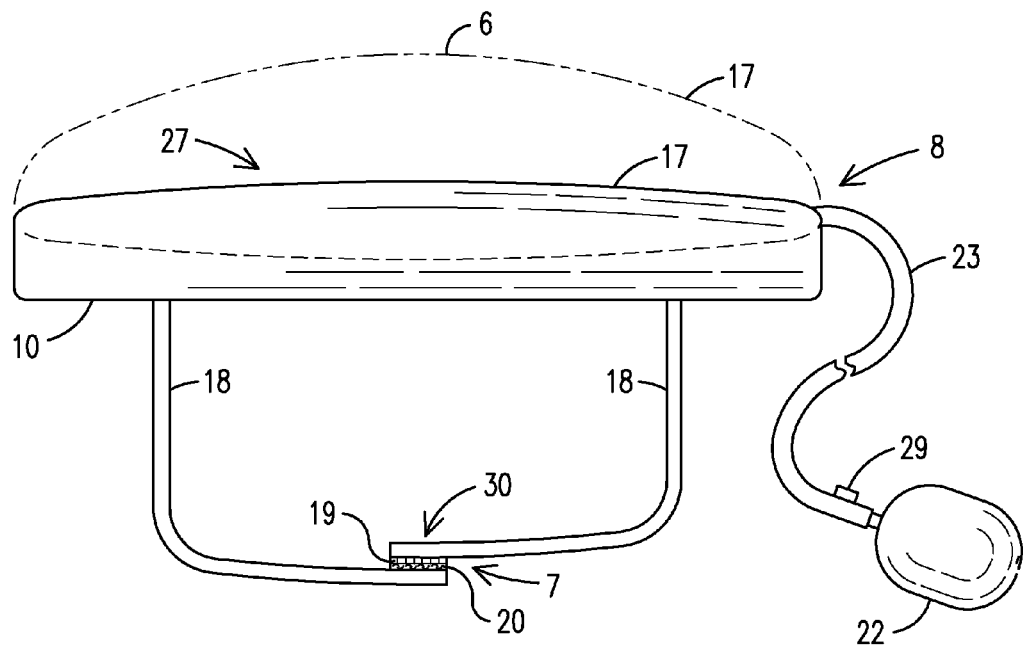
FIG. 7 is a top view of an inflatable vehicle seat neck protection device of the present invention having an alternate securing means.

FIG. 7 shows a top view of an inflatable vehicle seat neck protection device of the present invention having an alternate securing means. The vehicle neck protection device 8 has an inflatable bladder 17 that forms the convex surface 6 to protect and support the nape of the neck 4 of a user. The bladder 17, which preferably includes a pump 22 and release button 29 connected to the bladder 17 via a tube 23, may be inflated or deflated so as to give a customized fit for a user's nape of the neck 4. In the alternative, the bladder 17 may automatically inflate upon strong impact on the vehicle, such as during car crashes or accidents.

The securing means 7 may include at least one post securing strap 18 for securing the device 8 around the posts 3 wherein the post securing straps 8 have at least one fastening means 30, which may be hook and loop fastening means 19 and 20. However, the vehicle neck protection device 8 with inflatable bladder 17 may also be built into the headrest 1.

Figure 8:
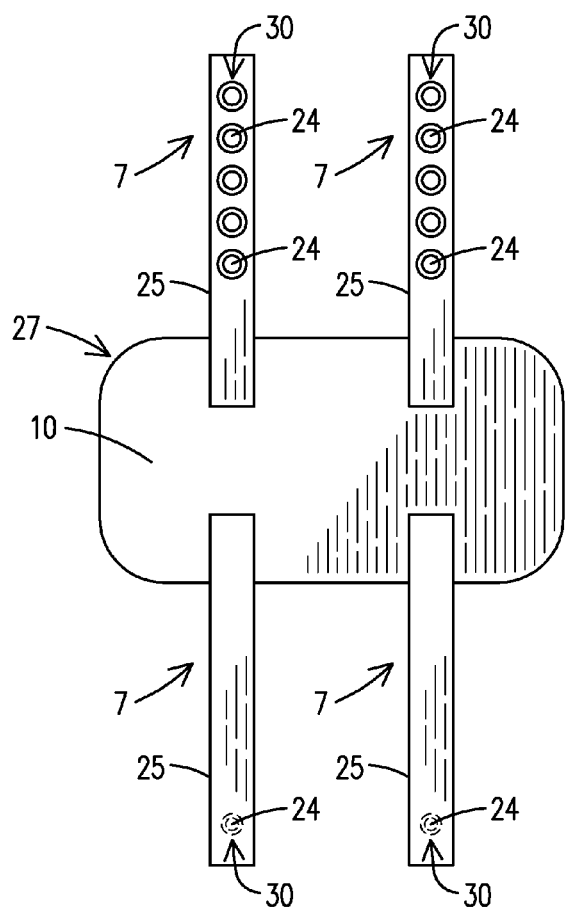
FIG. 8 is a rear plan view of a vehicle seat neck protection device of the present invention having an alternate securing means.

Finally, FIG. 8 shows a rear plan view of a vehicle seat neck protection device of the present invention having an alternate securing means. Rather than the securing means 7 securing to the posts 3, the securing means 7 may be secured to or about the headrest 1 itself via at least one vertical strap 25 secured to the rear wall 10. The vertical straps 25 include at least one fastening means 30, which may be snaps 24, to secure the straps 25 about the headrest 1. Because more than at least one fastening means 30 is provided, a user is permitted to adjust the height of the vehicle seat neck protection device 8 in relation to the headrest 1. The at least one vertical strap 25 may also be used in conjunction with other securing means 7 described above.

Although the fastening means 30 are shown as snaps and hook and loop fastening means 19 and 20, other fastening means 30, such as buttons, buckles, elastic straps and the like may be used.

The use of the present invention will allow a person to have protection and support on his/her nape of the neck while sitting in a vehicle seat.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. A vehicle neck protection device for protecting and supporting a nape of a neck of a user wherein said vehicle neck protection device is securable to at least one post of a vehicle headrest, said vehicle neck protection device comprising:
   a body having a front surface, back surface and a predetermined size and shape;
   said body having a convex surface curving outward from top to bottom across the entire front surface of the body for positioning behind the nape of a neck of the user;
   a rear wall located on said body;
   at least one securing means located on said rear wall for securing said vehicle neck protection device to at least one post of a vehicle headrest;
   said at least one securing means having a first bracket moveably attached to a second bracket;
   at least one aperture located on said rear wall for removable insertion of said at least one securing means; and
   said at least one aperture extending from the rear wall towards the front surface a predetermined distance.

2. The vehicle neck protection device of claim 1 further comprising:
   a cushion area located within said body wherein said cushion area forms said convex surface.

3. The vehicle neck protection device of claim 2 further comprising:
   an area of dense foam located between said cushion area and said rear wall.

4. The vehicle neck protection device of claim 1 wherein said at least one securing means further comprises:
   a clamp located on the second bracket.

5. The vehicle neck protection device of claim 1 wherein said at least one securing means further comprises:
   a U-shaped member located on the second bracket.

6. The vehicle neck protection device of claim 1 wherein said at least one securing means further comprises:
   at least one screw located on the first bracket for securing the first bracket to the at least one aperture by inserting the at least one screw into the at least one aperture.

7. A vehicle neck protection device for protecting and supporting a nape of a neck of a user wherein said vehicle neck protection device is securable to at least one post of a vehicle headrest, said vehicle neck protection device comprising:
   a body having a front surface, back surface and a predetermined size and shape;
   said body having a convex surface curving outward from top to bottom across the entire front surface of the body for positioning behind the nape of a neck of the user;
   a rear wall located on said body;
   at least one securing means located on said rear wall for securing said vehicle neck protection device to at least one post of a vehicle headrest;
   said at least one securing means having a second bracket and a clamp located on the second bracket that secures the second bracket to the least one post of the vehicle headrest;
   said at least one securing means further having a first bracket attached to the rear wall and slideably attached to the second bracket to allow a user to adjust the distance between the rear wall and the at least one post of the vehicle headrest;
   at least one aperture located on said rear wall for removable insertion of said at least one securing means; and
   said at least one aperture extending from the rear wall towards the front surface a predetermined distance.

8. The vehicle neck protection device of claim 7 further comprising:
   a cushion area located within said body wherein said cushion area forms said convex surface.

9. The vehicle neck protection device of claim 8 further comprising:
   an area of dense foam located between said cushion area and said rear wall.

10. The vehicle neck protection device of claim 7 wherein said at least one securing means further comprises:
    a clamp located on the second bracket.

11. The vehicle neck protection device of claim 7 wherein said at least one securing means further comprises:
    a U-shaped member located on the second bracket.

12. The vehicle neck protection device of claim 7 wherein said at least one securing means further comprises:
    at least one screw located on the first bracket for securing the first bracket to the at least one aperture by inserting the at least one screw into the at least one aperture.

13. A vehicle neck protection device for protecting and supporting a nape of a neck of a user wherein said vehicle neck protection device is securable to at least one post of a vehicle headrest, said vehicle neck protection device comprising:
    a body having a front surface, back surface and a predetermined size and shape;
    said body having a convex surface curving outward from top to bottom across the entire front surface of the body for positioning behind the nape of a neck of the user;
    a rear wall located on said body;
    at least one securing means located on said rear wall for securing said vehicle neck protection device to at least one post of a vehicle headrest;
    said at least one securing means having a second bracket and a clamp located on the second bracket that secures the second bracket to the least one post of the vehicle headrest;

said at least one securing means further having a first bracket attached to the rear wall and slideably attached to the second bracket to allow a user to adjust the distance between the rear wall and the at least one post of the vehicle headrest;

at least one lower row of apertures located on said rear wall for removable insertion of said at least one securing means;

at least one upper row of apertures located on said rear wall above said at least one lower row of apertures for removable insertion of said at least one securing means;

each aperture in said at least one lower row of apertures extending from the rear wall towards the front surface a predetermined distance; and each aperture in said at least one upper row of apertures extending from the rear wall towards the front surface a predetermined distance.

14. The vehicle neck protection device of claim 13 further comprising:
   a cushion area located within said body wherein said cushion area forms said convex surface.

15. The vehicle neck protection device of claim 14 further comprising:
   an area of dense foam located between said cushion area and said rear wall.

16. The vehicle neck protection device of claim 14 wherein said clamp is a U-shaped member located on the second bracket.

17. The vehicle neck protection device of claim 14 wherein said at least one securing means further comprises:
   at least one screw located on the first bracket for securing the first bracket to the at least one aperture by inserting the at least one screw into the at least one aperture.

* * * * *